United States Statutory Invention Registration [19]

[11] Reg. Number: H967

Mariotti

[43] Published: Sep. 3, 1991

[54] HIGH SPEED, LONG DISTANCE, DATA TRANSMISSION MULTIPLEXING CIRCUIT

[75] Inventor: Razvan Mariotti, Boulder, Colo.

[73] Assignee: The United States of America as represented by the United States Department of Energy, Washington, D.C.

[21] Appl. No.: 472,546

[22] Filed: Jan. 30, 1990

[51] Int. Cl.[5] ..... H04J 3/04

[52] U.S. Cl. ..... 370/112; 370/85.1; 370/105

[58] Field of Search ..... 370/112, 85.1, 105.1, 370/105

[56] References Cited

U.S. PATENT DOCUMENTS

| | | | |
|---|---|---|---|
| 4,477,900 | 10/1984 | Gruenberg | 370/112 |
| 4,575,839 | 3/1986 | Ogata et al. | 370/58.1 |
| 4,592,046 | 5/1986 | Kawata et al. | 370/58.1 |
| 4,718,058 | 1/1988 | van Vugt | 370/58.1 |
| 4,759,018 | 7/1988 | Buchner | 370/112 |
| 4,815,074 | 3/1989 | Jacobsen | 370/112 |

*Primary Examiner*—Linda J. Wallace

*Attorney, Agent, or Firm*—Vale P. Myles; Thomas G. Anderson; William R. Moser

[57] ABSTRACT

A high speed serial data transmission multiplexing circuit, which is operable to accurately transmit data over long distances (up to 3 Km), and to multiplex, select and continuously display real time analog signals in a bandwidth from DC to 100 Khz. The circuit is made fault tolerant by use of a programmable flywheel algorithm, which enables the circuit to tolerate one transmission error before losing synchronization of the transmitted frames of data. A method of encoding and framing captured and transmitted data is used which has a low overhead and prevents some particular transmitted data patterns from locking an included detector/decoder circuit.

7 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

| START | TYPE | 12 DATA BITS | | STOP |
|---|---|---|---|---|
| 1 | 1 | MSB | LSB | 1/0 |

*Fig. 6a* BIT ASSIGNMENT FOR NON TDM CHANNELS 15 BITS FRAME

| START | TYPE | | SPARE BIT | 12 DATA BITS | | STOP |
|---|---|---|---|---|---|---|
| 1 | 0 | X X | V | MSB | LSB | 1/0 |
| | | CHANNEL NUMBER ENOODED | | | | |

*FIG. 6b* BIT ASSIGNMENT FOR TDM CHANNELS 18 BITS FRAME

| |
|---|
| APPLICATION |
| PRESENTATION |
| SESSION |
| TRANSPORT |
| NETWORK |
| DATA LINK<br>LOGICAL LINK CONTROL (LLC)<br>MEDIUM ACCESS CONTROL (MAC) |
| PHYSICAL |

*Fig. 7* OSI REFERENCE MODEL

HIGH SPEED, LONG DISTANCE, DATA TRANSMISSION MULTIPLEXING CIRCUIT

This invention was made with Government support under contract number DE-AC02-76CH00016, between the U.S. Department of Energy and Associated Universities, Inc. The Government has certain rights in the invention.

BACKGROUND OF THE INVENTION

There are many well known varieties of data transmission systems in which analog-to-digital (A/D) conversion techniques are employed in combination with fiber-optic communications links. Still, the need frequently arises to develop unique transmission systems and related components and sub-circuits in order to satisfy the particular demands of new systems applications. The present invention was conceived and developed to satisfy one class of such a demanding systems application. Accordingly, the preferred embodiment of the invention will be described herein with reference to that particular systems application, but it will be recognized that the novel system circuit of the invention can be readily used to satisfy the needs of other systems applications in the same class of high speed, long distance, data transmission multiplexing circuits.

A preferred embodiment of the invention was developed for application in the Main Control Room (MCR) of the Alternating Gradient Synchrotron (AGS) that is in operation at Brookhaven National Laboratory, Upton, NY. In that application there existed a need to select and display analog signals from a plurality of devices that are widely spaced around the AGS Particle Accelerator Ring. These selected signals have to be transmitted for relatively long distances (e.g. up to 3 Km (Kilometers)), and have to be screened for selection as desired by a human operator, and then the signals need to be continuously displayed, in real time, on a number of control monitors in the MCR. A subset of those signals, that may originate from as many as 250 possible analog signal generating devices has to be selected and simultaneously displayed. The analog signals of interest have a bandwidth from DC (direct current) level to 100 Khz (Kilohertz), in the range of +/−10 V (Volts).

In this AGS systems application there exists a system of analog signal distribution and multiplexing, which consists mainly of a combination of electronic and mechanical switches that are operable to select analog signals at remotely positioned source devices, and various operational amplifiers and line drivers that are used to distribute these analog format signals to multiple monitoring consoles at a centralized monitoring point in the Main Control Room. This existing system had many disadvantages, some of which were that the signals were transmitted in analog form, and the selection of the signals to be multiplexed and monitored was complex and difficult to operate.

In order to solve the unique problems presented by this demanding systems application, a new digital data distribution system needed to be conceived and developed. This new system, which comprises the subject invention, can be regarded as a one way digital data communication system for effecting high speed, long distance data multiplexing transmission from widely spaced signal generating source devices in the field, e.g. the source devices spaced around the AGS Particle Accelerator Ring, to the display consoles in the MCR.

There are two well known notable advantages of digital transmission, versus analog transmission, that make it extremely attractive for use in such high speed, long distance, multiplexed data communication systems. They are:

a) Noise does not accumulate at repeaters and thus such noise becomes a secondary consideration in system design, whereas in analog systems it is the primary consideration.

b) The digital format lends itself ideally to solid-state technology and to computer control and data processing.

While digital data transmission systems have increasingly used modems to transfer signals over the analog telephone network, the existing telephone networks have been turning to the use of digital techniques to transfer analog signals.

In order to achieve the desired accuracy of transmission of analog monitored signals in the range of +/−10 V, −10 V, it has been determined that A/D conversion has to ensure 12 bits precision. In the preferred embodiment of the invention, as used in the application at the AGS, a minimum of ten samples per period are requested for the digitalized signals. This led to a sampling rate of 1 Mhz (Megahertz), with 12 bits accuracy per sample.

The prior-art technologies of digital telephony, and lately of the Integrated Services Digital Network (ISDN) technology, does not satisfy the unique and demanding systems and bandwidth requirements of the analog signals that need to be monitored and transmitted at high speeds, over long distances, and be multiplexed in the environment of the AGS application. The high speed, high accuracy data acquisition systems now commercially available do not have the flexibility to multiplex and select as many channels as are required by this demanding type of systems application. Other technologies were investigated but it was found that none of them possess the needed high-level capability of continuous, real time data acquisition and needed transmission capabilities for long distances. Accordingly, it was determined that the known, existing technologies investigated could not afford appropriate technological or suitable cost/performance solutions for the specific demanding systems requirements of the AGS Particle Accelerator Ring and MCR.

The design of a new high speed, long distance, multiplexing digital data distribution system, according to the present invention, has the following main features. It uses analog input signals in the frequency range from direct current (DC), or zero hertz level, to 100 Khz. These analog signals are sampled at a minimum rate of ten samples per cycle in the preferred embodiment, but it will be understood that different sampling rates can be used when applying the invention to less demanding transmission systems applications in the long distance, high speed, multiplexing class. The sampling rate used in the preferred embodiment is 1 Mhz and the data accuracy is 12 bits per sample, for a voltage range of +/−10 V. The sampled analog input signals are digital encoded and framed using a suitable Pulse Code Modulation (PCM).

OBJECTS OF THE INVENTION

A major object of the present invention is to provide a high speed multiplexing circuit that is operable over long distances to accurately transmit, select and continuously display real time analog signals. Such a system will include data sampling, A/D conversion, encoding, framing and high-speed signal transmission, serial interfaces for electrical and optical lines, data sampling, A/D conversion, TDM encoding, framing and transmission, followed by high speed digital multiplexer cross point switching that is remote configurable, and transmission to sequencer/decoder modules for data decoding and D/A conversion.

Another object of the invention is to provide a data transmission circuit and protocol that use high speed serial synchronous transmission for data communication.

Yet another object of the invention is to provide a fault tolerant receiver sequencer/decoder circuit that uses selected character frames in order to detect certain characters, thereby to synchronize the detection with a selectable mode of operation, for both TDM and non-TDM types of transmission. The receiver is made fault tolerant by employing a "fly-wheel" algorithm that can tolerate one transmission error before the state machine of the decoder circuit loses synchronization.

A further object of the invention is to provide a transmission system that uses an encoding/framing technique to provide a minimum amount of extra bits for framing (low overhead) in order to reduce the transmission bit rate and also to prevent some particular data transmitted patterns from locking the detector/decoder circuit.

SUMMARY OF THE INVENTION

In the preferred embodiment disclosed herein a high speed, long distance data multiplexing transmission circuit is provided in which digitalized data captured from an A/D converter are framed and transmitted. A 1 Mhz sampling rate is used to provide 10 samples for each period of the analog input signals in the 100 Khz bandwidth. The data communication system is operable to use a Time Division Multiplexing (TDM) approach for transmitting lower frequency signals, e.g. in the bandwidth of 20 Khz, also with a minimum of 10 samples per cycle of analog input signal. In the preferred embodiment, each frame consists of 12 data bits and 3 overhead bits for framing. The first overhead bit is the start bit and the third or last overhead bit is used to indicate the type of transmission; i.e. either Time Division Multiplexed (TDM) or non-TDM (regular) transmission. For the TDM mode of operation, each framed character has 12 data bits, 2 bits for start-stop, one bit to indicate the type of the channel (TDM or non-TDM) and 2 bits for encoding the channel number.

Figure 1:
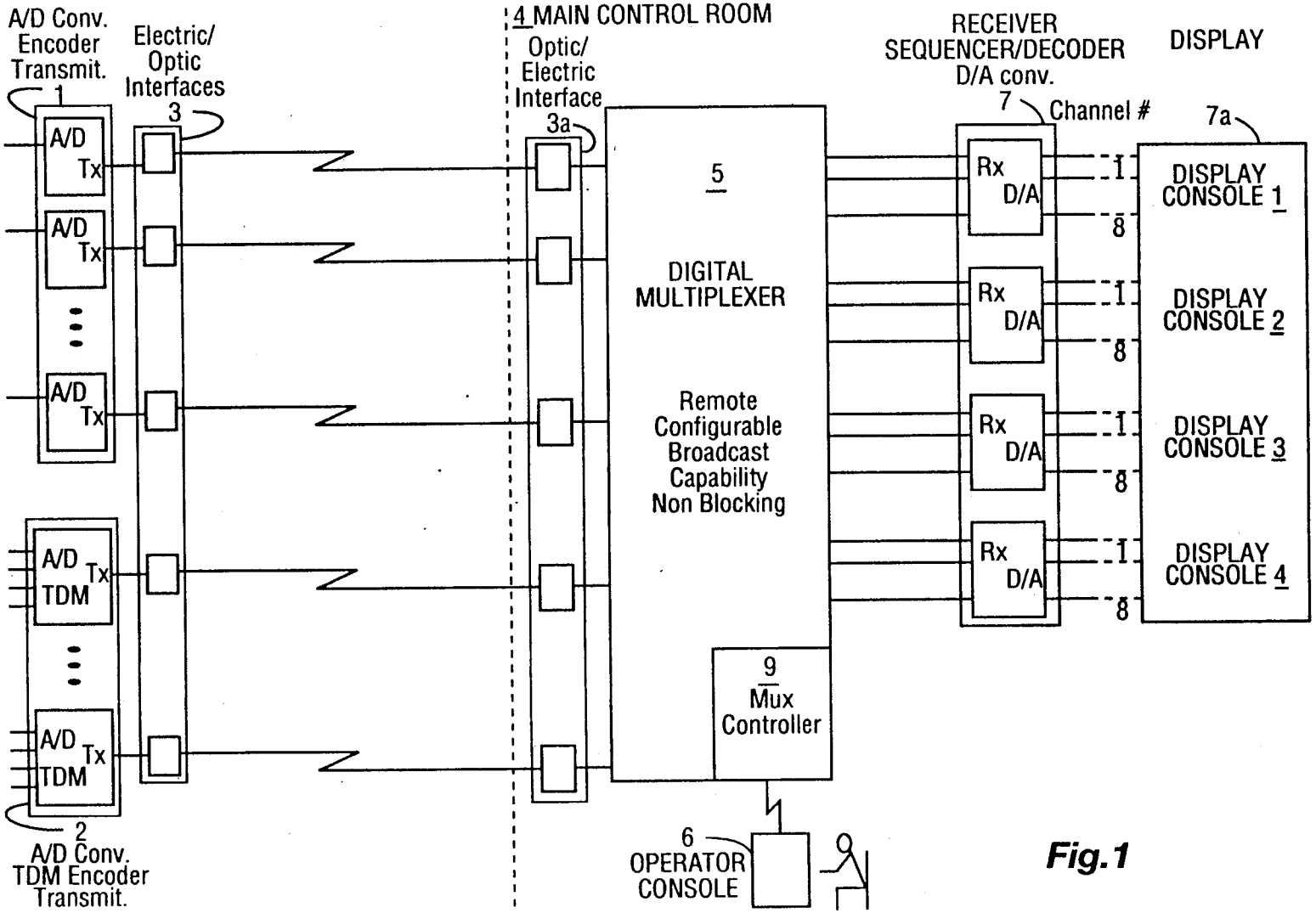
FIG. 1 is a schematic block diagram of a high speed, long distance, multiplexing data transmission system circuit for effecting A/D conversion, encoding analog signal capture, and optical distribution of a large number of analog signals generated at widely spaced source devices, according to the present invention.

FIGS. *6a* and *6b* illustrate the bit frame assignment used in operating the preferred embodiment of the invention for, respectively, either high frequency non-TDM channels or for lower frequency TDM channels, as used in the systems circuit of FIG. 1.

FIG. 7 presents the Open Systems Interconnection (OSI) layers that pertain to the protocol used in operating the circuit shown in FIG. 1, in the preferred embodiment disclosed herein.

Figure 5:
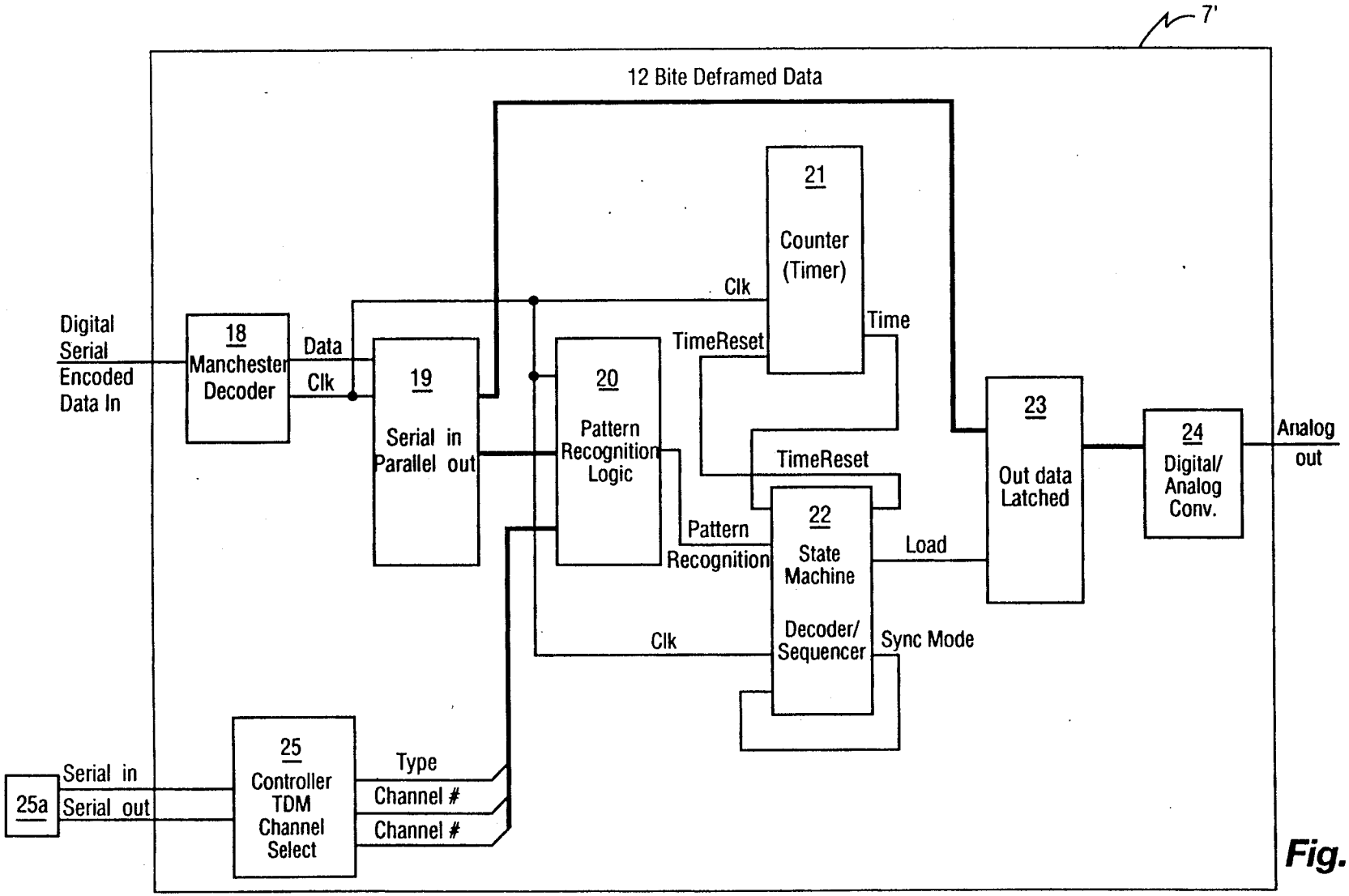
FIG. 5 is a block diagram of the receiver decoder or sub-circuit for one channel of the circuit shown in FIG. 1.
Figure 8:
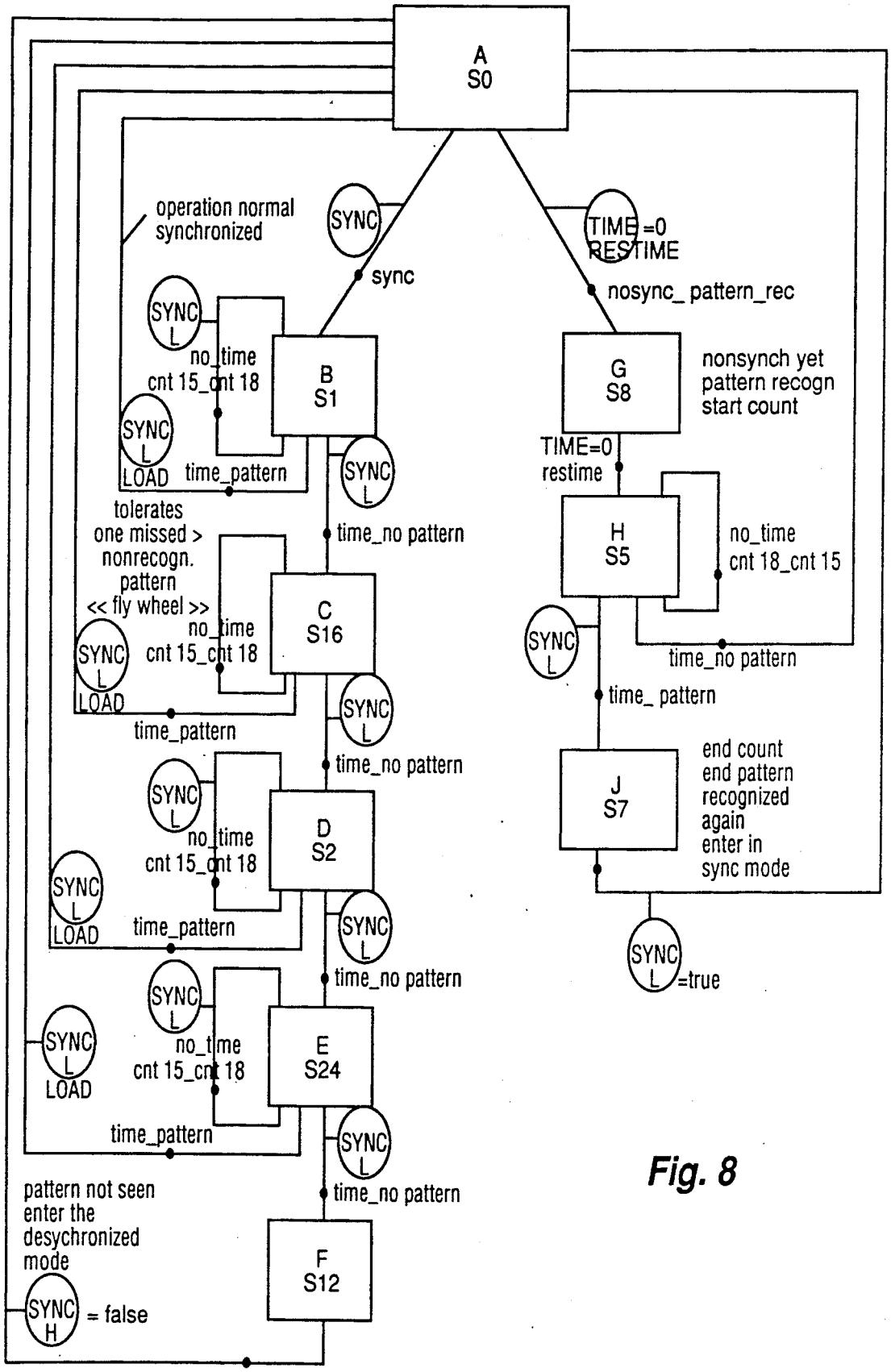

FIG. 8 is a schematic block diagram of a state machine used in the receiver decoder for one channel of the circuit shown in FIG. 5.

Figure 9:
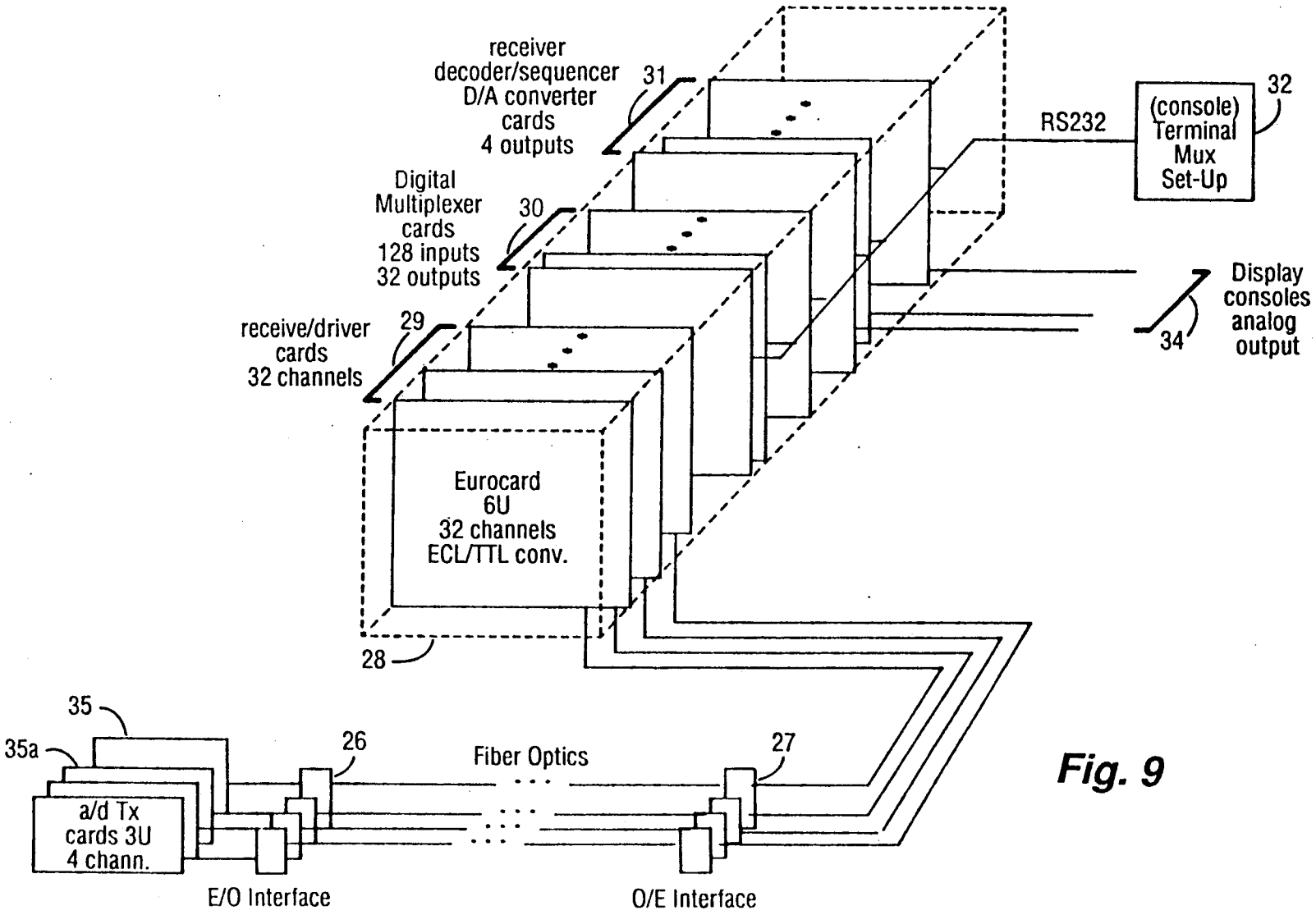

FIG. 9 is a schematic block diagram showing an exploded, perspective view of one physical arrangement of circuit boards for the disclosed preferred embodiment, and illustrating packaging of the circuit for digital capture and optical distribution system components of the systems circuit shown in FIG. 1.

Appendix A is a sample computer program written in Intel Corporation's programming language PLM/51, as an example for use with the configuration and preferred operation protocol of the digital multiplexer shown in the circuit of FIG. 1.

Appendix B is a documentation file used for the Programmable Logic Device (PLD) part for the frame pattern recognition used in the preferred embodiment of a decoder circuit shown in FIG. 5.

Appendix C is the documentation file used to program the state machine circuit used in the FIG. 5 embodiment as part of the systems circuit of FIG. 1.

DESCRIPTION OF THE PREFERRED EMBODIMENT

As the system circuit is presented in FIG. 1, raw data is captured at remotely positioned source devices, which can comprise any device that generates an analog signal in the bandwidth of 0 to 100 Khz, by a plurality of high speed data sampling A/D converters that encode, frame and transmit data. Lower speed channels are similarly captured and Time Division Multiplexed (TDM) by suitable conventional TDM circuits and data sampling A/D converters that TDM encode, frame and transmit captured data. The Digital Data are encoded, framed, and transmitted over twisted pair wires, as shown, to and through commercially available electrical/optical interfaces, to a central high speed Digital multiplexer cross point switch module which in the disclosed preferred embodiment is a conventional multiplexer circuit situated in the Main Control Room (MCR) of the AGS, which MCR schematically represented by the dashed line 4.

The selected signals to be displayed are routed by the Digital Multiplexer circuit 5 to a plurality of receiver sequencer/decoder and D/A converter circuits 7. At this point, i.e. in the receiver sequencer/decoders 7, the serial transmitted digital signals are deframed, decoded and converted back to analog, in order to be displayed on a plurality of corresponding display consoles 1–4 (*7a*), which are of conventional design. Each console 1–4 is made to be capable of displaying 8 output signals; thus, the four illustrated consoles can display a total of 32 signals. Accordingly, 32 outputs are needed from the Central Digital Multiplexer 5.

The Central Digital Multiplexer 5 is made modular and expandable, up to 256 inputs. And is arranged so that any of the input signals can be connected to any of the 32 outputs. The Digital Multiplexer 5 is remote controlled from the keyboard of a conventional Operator Console 6, so that the desired input is readily connected to a desired output terminal. In that way the desired input signal channel is routed to a selected display console (1–4) of the consoles *7a*.

In general, these programmable switches in the Digital Multiplexer 5 are used to connect one of many inputs to one or more outputs. Initially, crosspoint-switch integrated circuits (ICs) were developed to replace electro-mechanical switches (relays) in electronic telephone-switching systems. In the telecommunication field, analog switches are still cost effective but digital switches are becoming more and more popular for larger systems. The need for speed and reduced circuit space requirements on the IC boards, as well as the desire to reduce the required number of IC boards made the selection of digital switches for the preferred embodiment being disclosed the most appropriate and the best cost/efficient choice.

Use of ICs was extended in parallel-processing, industrial-control signal routing, and data-communications systems. For any "n×m" crosspoint switch, n equals the number of inputs, m equals the number of outputs, and the IC includes n times m distinct switches. In order to specify the input/output (I/O) channel connection, specific values have to be loaded in registers. The architecture of the digital switches includes internal building blocks such as input registers, and output buffers. Most digital switches are non-blocking; thus, any input can be connected to any output, even if that input has already been assigned to another output. The selected 3-state outputs make it possible to cascade multiple ICs to create a larger switching matrix, if desired.

Figure 2:
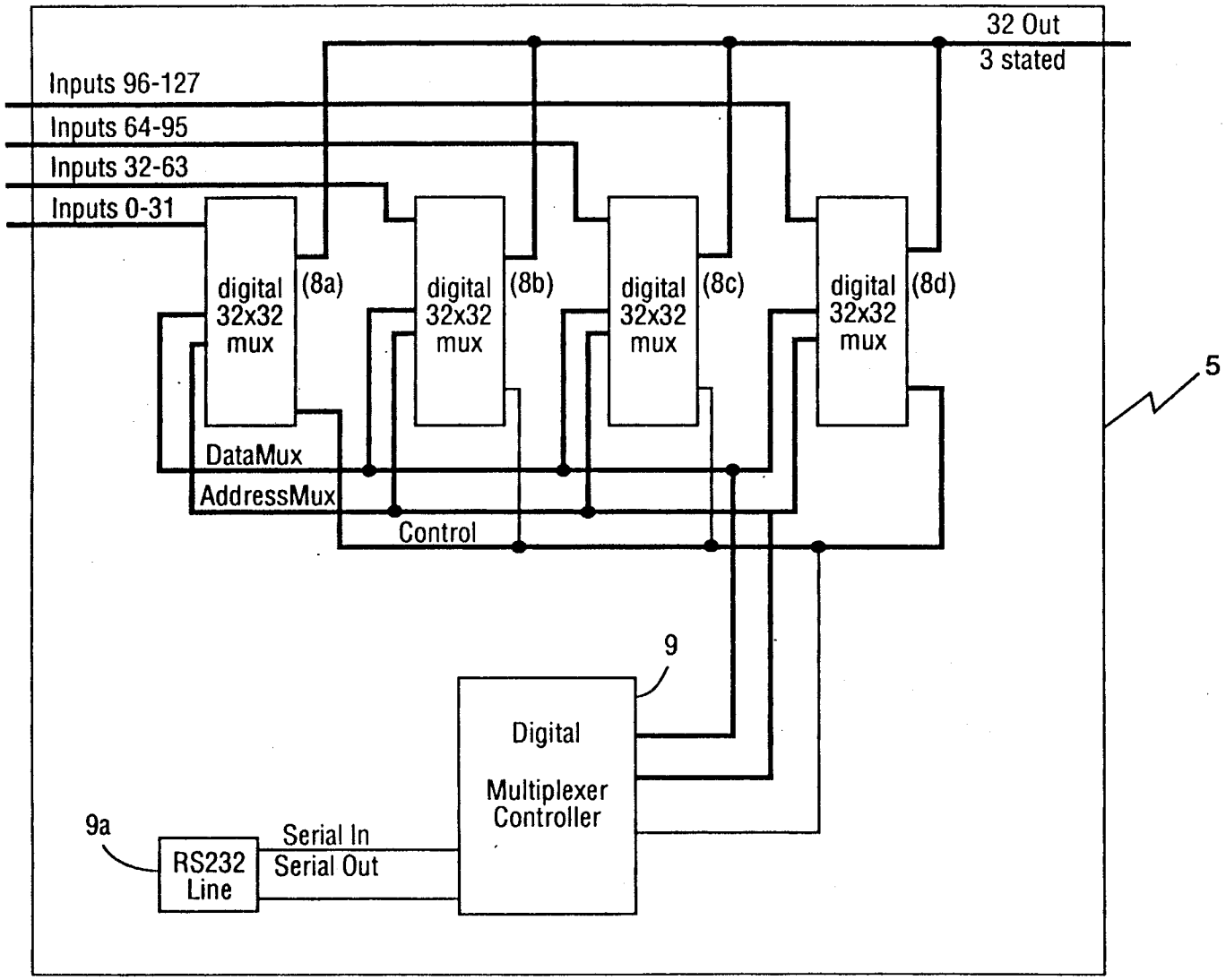
FIG. 2 is a schematic block diagram of the Digital Multiplexer circuit used in the circuit illustrated in FIG. 1.

The circuit of the Digital Multiplexer 5 is presented in more detail in FIG. 2, as a plurality of building blocks (*8a*, *8b*, *8c*, and *8d*). In the disclosed preferred application, the Digital Multiplexer 5 uses as a general purpose digital crosspoint switches the modules (*8a*, *8b*, *8c* and *8d*). In this embodiment these modules comprise, Sierra Semiconductor's SC11320 IC, which is a monolithic CMOS chip, having 32 inputs and 32 outputs. The Multiplexer 5 can independently connect each of its 32 CMOS-compatible inputs to one or more of its 32 outputs in a non-blocking fashion. By cascading four such ICs, a digital multiplexer card with 128 inputs and 32 outputs is implemented. The input-signal frequency can be as high as 50 Mhz; the maximum signal skew from input to output is 2 nanoseconds (ns). The SC11320 IC chip consists of thirty-two 32:1 multiplexers, one for each output. Each of the outputs also has an associated 6-bit register. The first five bits of this output register determine which input channel is connected to that particular output. The sixth bit determines the state of the output, high impedance or driving status.

The operation of routing one input signal to a desired output consists of the following two steps, via the operator console:

1. Disconnect any previously established connection to the selected output.
2. Establish the desired new connection.

Both those operating steps consist of writing in the appropriate registers the encoded input channel number. The time required for programming one output can be as low as 170 ns.

The Digital Multiplexer Controller 9, which is part of the Multiplexer 5, has the task of enabling an operator at console 6 to "program" or configure the routes in the Digital Multiplexers. Using the I/O ports of the micro-Multiplexer-controller 9 the individual digital multiplexer modules (*8a–8d*) are selected and addressed, then the desired information is written in the output registers. The process is similar to that used with addressing and read/write in a memory IC. The micro-controller 9 is connected to communicate with the operator via the Console 6 keyboard, through the serial port by a conventional RS232 line *9a*. In the preferred embodiment, an Intel 87C51AF micro-controller is used in the Controller 9 to implement the controller functions. The parallel ports of the micro-controller (9) are used as address lines, and control and data buses to the digital multiplexer modules (*8a–8d*). The microcontroller 9 executes operator commands so as to configure the Digital Multiplexers to a desired status, or read the current status of the Multiplexer and send that information to the operator.

Sample Computer Program

The sample program is written in Intel Corp's programming language PLM/51 and is included as Appendix A, which is briefly described as follows:

The program used herein as an example has an assigned purpose of connecting the first 32 inputs (from the total of 128 on the card as shown in FIG. 2) to the 32 tri-stated outputs of the Digital Multiplexers. The connection in this example is done in bi-unique mode: input number 1 is connected to the output number 1 and so on, until input 32 is connected to output 32. This means that all the inputs of the last multiplexer module (*8d*) are connected to the outputs of the digital multiplexers. The outputs of the other non-connected modules (*8b*), (*8c*), and (*8d*) have to be tri-stated or disconnected by writing a "0" in the sixth bit of every output register. Only the outputs of the module (*8a*) are enabled (having "1" written in the output register).

Lines 5 to 11 in the listing of the program, from Appendix A, assign bits of the parallel port P1 of the micro-controller 9 for different line controls of the digital multiplexer modules (*8a–8d*): Bits 1 and 2 control two light emitting diodes (LED) on a card used for test and debug purposes; bit 3 enables the multiplexer modules, the name of the variable is ENN_P1_3; bit 4 is used as write line, the assigned name of the variable in the listing is WRN_P1_4; Bits 5 and 6 encode the chip select of the four digital multiplexers on the card, with the names CSA_P1_5 and CSB_P1_6. Decoding these two signals one obtains the chip select signal for each module (*8a–8d*). Bit 7 is a general reset and the name of the variable is RSTN_P1_7.

In line 12 of the program listing (Appendix A), the first 5 bits of the parallel port P0 are used as address lines to select the desired output register in the multiplexer module. The first 6 bits of the port P2 are used for the data to be written in the output register. In line 13 the first 5 bits encode the input number that is going to be connected. In line 6 the sixth bit of P2 represents, as discussed above, the status of the output written in the output register, i.e. tri-stated or not.

In line 19 of the program listing a block of memory "INOUT" of 128 locations is reserved in order to store all of the output status registers for all of the 4 multiplexer modules (8a–8d); (4×32 registers each=128 locations).

Lines 20 to 32 of the program listing represent the "Connect" routine used to write in each of the 32 output registers the input which is connected with it and the status of each of these respective outputs. In this example, input "i" is connected to the output "i" for the first 32 inputs, as an initialization of the Digital Multiplexers. In listing line 24 there is written at the port P0 the address of the output register. In line 25 there is written at the port P2 the number of the desired input to be connected, which is found in the previously defined 128 locations memory table. Lines 27 to 30 toggle the "write" and "enable" bits in order to write the information (line 25) at the selected address register of the digital multiplexer submodule (line 24). Line 26 sets the output status bit in the written register to enable: "1".

Lines 33 to 43 of the program listing represent the "Disconnect" routine. As stated (and shown in FIG. 2), the four sub-modules (8a–8d) are cascaded having their outputs in common. At a particular time only one of the modules has to be enabled (having a "1" in the sixth bit of the output register). For example, if input 100 is connected to the output 2, it means that only module (8d) has the output 2 enabled. Modules (8a), (8b), (8c) have their outputs 2 disabled (tri-stated).

As in the previous routine, listing lines 36 and 37 provide the address of the output register and the data to be written. In this case just the sixth bit is "0". Similarly, the enable and write bits are toggled.

Lines 44 to 61 represent a test routine for the Digital Multiplexer routine that will be run after the "connect" routine. It can be developed as a power-up self test of the board. This test is for checking if the content of the output registers residing in the digital multiplexer's submodules (8a–8d) is identical with the content of the "INOUT" block of memory resident in the micro-controller 9.

The "mask1" in program listing line 46 is used to limit the operator's check only on the first significant data bits read at the port P2: input number and status of the output. If a match does not exist the ERR bit is set.

Lines 58 to 61 initialize the first 32 bytes of the INOUT memory block with the values representing the input numbers to be connected at each output, respectively. For our example: at output 1 there is connected input 1; and so on, until at output 32 there is connected output 32.

Lines 62 to 64 of the listing select the module (8b) and disconnect all its outputs from the tri-stated bus of the Digital Multiplexers. Similarly lines 65 to 67 act for the module (8c) and lines 68 to 70 for the module (8d). Lines 71 to 74 connect all the first 32 inputs to the 32 outputs, and in line 74 the test routine is executed.

According to the status of the ERR variable, the program goes in the loop represented by listing lines 75 to 86, or to lines 88 to 97. In this example, according to the existence of an error, the two control LED (Led1" and Led2") will be toggled simultaneously (no error in read/write check of the digital multiplexer) or, alternatively they are toggled if errors exist.

When the control operator wants to make a change from the operator console (6), in order to connect at a specific output some other desired input, the following steps should be taken: A specific command will be sent by the operator, from the operator console 6 to the micro-controller card 9 on the serial interface RS232 line (9a). That command will include the address at which the micro-controller responds, the type of command and the data. The types of commands are:

Read status, in which case the micro-controller 9 will send to the operator console 6 the contents of the INOUT memory block representing the current status of the digital multiplexer 5 (i.e. which input is connected to which output).

Change status, the micro-controller will receive new connections to be made; those changes are to be operated in the INOUT memory block.

Execute status, the micro-controller will up-date the contents of the output registers of the modules (8a–8d) according with the current data in the INOUT memory block. (Before a new "connection" is made for some input to an output, that output should be "disconnected" from the previous input connection; that means that the sixth bit, (the status bit) has to be changed to "0").

At the inputs of the Digital Multiplexer 5 are connected the data encoded and transmitted from the high speed transmission channels 15, or from the TDM channels 2.

Figure 3:
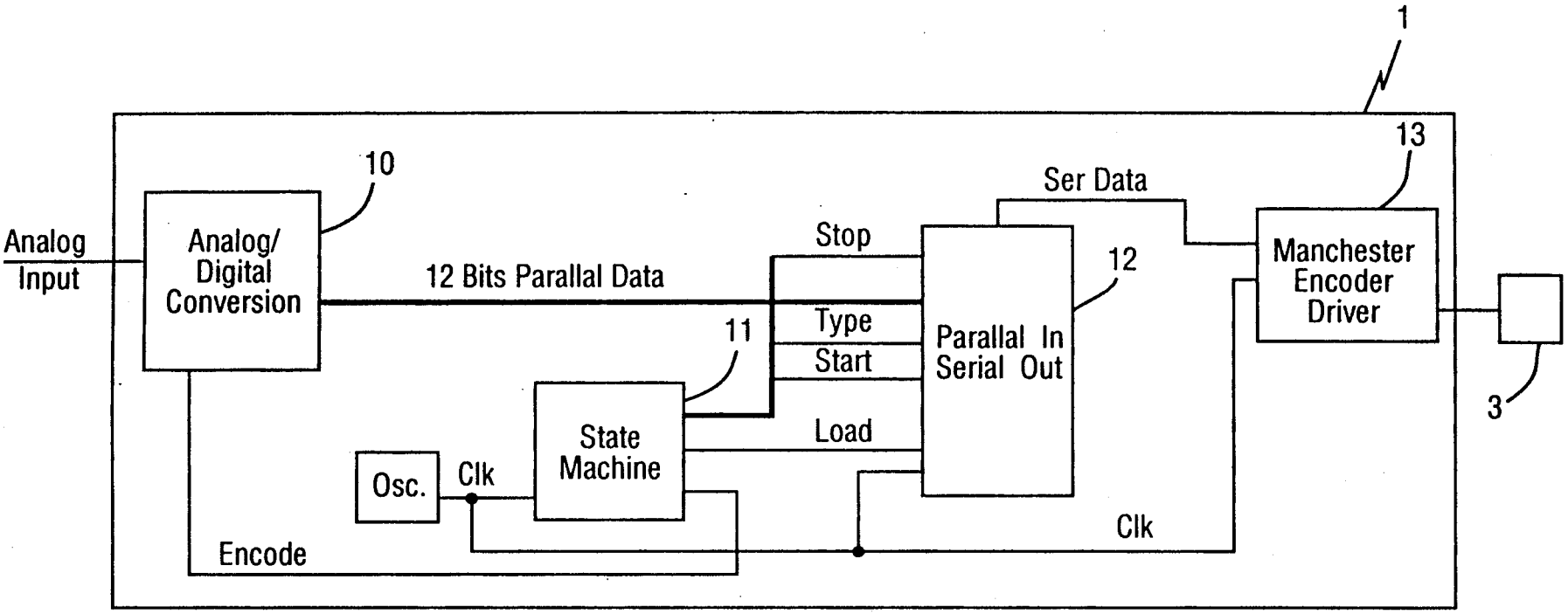
FIG. 3 is a block diagram of a high speed A/D converter/encoder and data transmission circuit for one channel of the system circuit shown in FIG. 1.

A block diagram circuit of the high speed A/D converter and data transmission portion (1) for one channel of the system circuit shown in FIG. 1 is presented in FIG. 3. The 12 bit A/D converter 10 used in the preferred embodiment is a commercially available AD9003 IC module, which works at 1 Mhz sampling rate. The analog input circuit consist of two conventional AD713 amplifiers that are suitably configured in order to scale the signal for a +/−10 V analog input signal. The State Machine sequencer 11, which in this embodiment is implemented in a commercially available Programmable Logic Device (PLD) Am16r8-7, that provides the control signals for the encoder and for the parallel to serial conversion module 12, which in this embodiment is implemented using a commercially available 74F674 IC. The 15 bits frames are continuously transmitted. There are no "gaps" or spaces between the consecutive frames; a bi-phase clock approach is used in the design of the transmitter. Internal data are shifted in conversion module 12 and transmitted from a Manchester Encoder Driver 13 on the positive edge of the clock, and frames are parallel loaded in module 12 on the negative edge. The time width of the data bits in this non-TDM mode is identical with the time width of the data bits for the case of TDM data transmission. The Manchester Encoder Driver 13 is implemented in the preferred embodiment using a commercially available MAE-86 Manchester encoder IC. This encodes the serial data and sends them on twisted pair wires, as shown in FIG. 3, using an ECL driver circuit MC10124, to the electrical/optical interface 3, or can send them directly to the digital multiplexer 5 (see FIG. 1), if the distance of transmission is less than about 25 feet.

Figure 4:
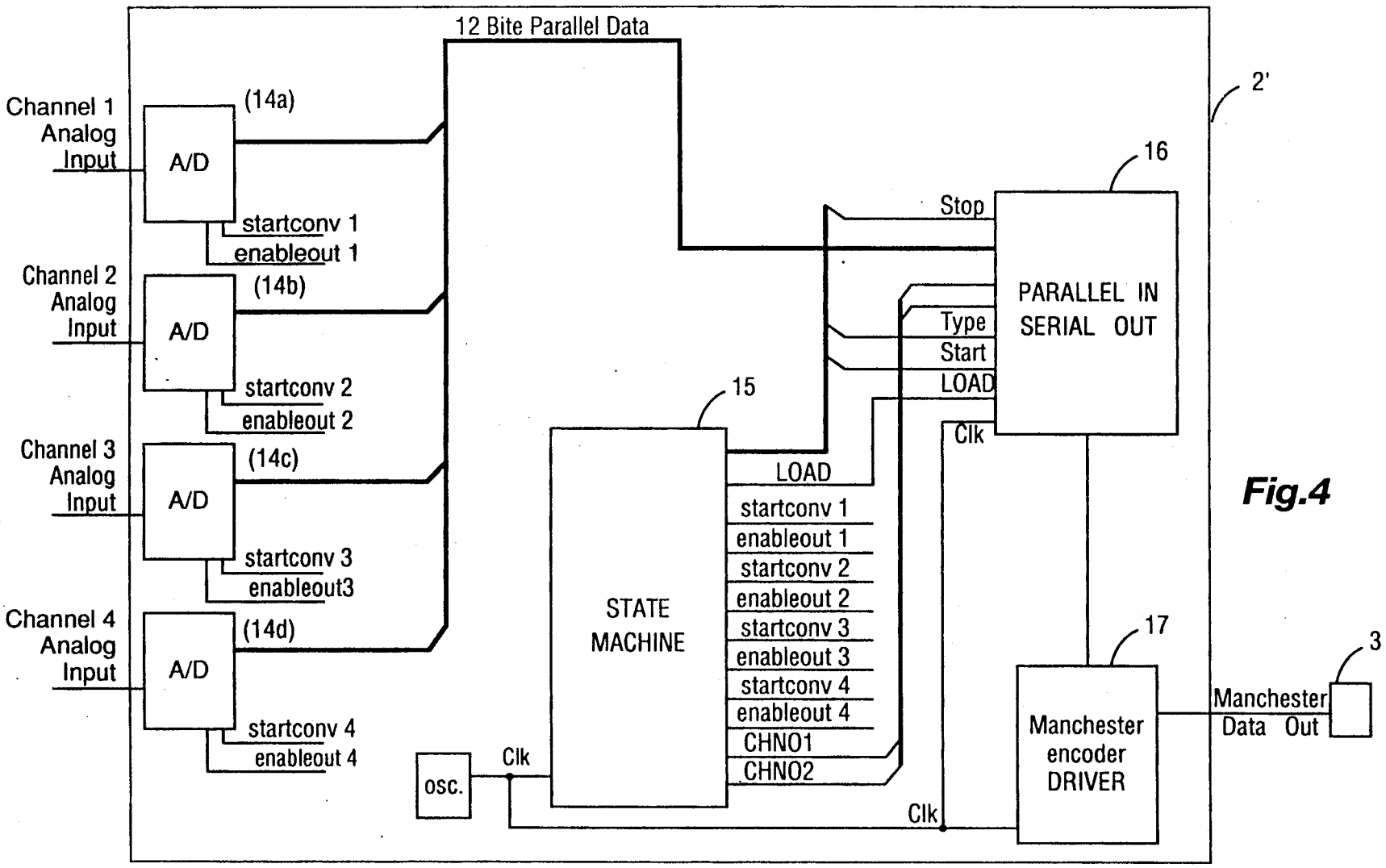
FIG. 4 is a schematic block diagram circuit for an A/D conversion of a 4 channel TDM arrangement, showing encoding and data transmission means. This block diagram constitutes a sub-module of the main systems circuit presented in FIG. 1.

FIG. 4 illustrates the circuitry (2') for one of the low speed, 4 channel A/D, TDM transmitter that are also generally shown by the circuit diagram block 2 in FIG. 1. The sampling rate per channel in the preferred embodiment is 200 Khz. For each of the 12 bit A/D converters (14a–14d) a commercially available AD678 chip is used. It has digital interface with tri-state outputs of the data bus. The four channels (14a, 14b, 14c and 14d) are arranged in order, and are sequentially controlled by signals generated at the outputs of a conventional state machine 15. Frames of serially transmitted signals, 18 bits in length are continuously sent out of a conventional Manchester encoder driver 17, and thence to an electric/optic interface 3. The four channels are scanned in order, without interruption. There are no "gaps" or spaces between the frames of the transmitted signals. The data bit time width is identical with that of the data bit time width for the non-TDM data transmission. There is the same basic clock transmission frequency as the transmission frequency used in non-TDM transmission.

The timing signals for scanning the four channels, data conversion and serial TDM transmission are provided by the state machine 15. This consist of commercially available Am16r8-7 and Am22v10 PLDs. Each channel has encoded its associated channel number along with the data and the frame bits. The channel number is also generated by the state machine in accordance with the current scanned channel signals (Start-Conversion and EnableOutput) for each channel as outputs of state machine 15.

Parallel data are framed at the input of a parallel serial in/out circuit 16 in the configuration shown in FIG. 6*b*, and is serial converted in circuit 16 using its 74F674 IC; then the data are Manchester encoded by a commercially available MAE-86 IC and transmitted by driver 17 with its block controlled.

A block circuit diagram for one channel of the receive-decoder module 7' (shown in FIG. 1' for the plural channels 7) is shown in FIG. 5. This circuit is operable to receive-decode either the TDM type of frames (18 bits long), or the regular frames (15 bits long), according to the remote selectable mode of operation. At the output of the Digital Multiplexer 5 the selected digital data enter into the decoder/converter A/D circuit 7. There the data are Manchester decoded in decoder 18, by a commercially available MAD-85 Manchester decoder IC in this embodiment, and are then serial converted in the Serialin/Parallelout register 19, by three cascaded F675 IC's, in the preferred embodiment. A valid output signal is provided to the state machine at every time when a pattern is recognized by the Pattern Recognition Logic circuit 20.

In the synchronous mode of operation, the pattern recognized signal comes at the input of the sequencer in the same time, with the time signal from the counter 21. The state machine in this embodiment consists of three circuit blocks: the pattern recognition 20, the counter 21 and the decoder/sequencer 22. All three of these blocks are am16r8-7 PLD components that are commercially available. The pattern recognition circuit 20 monitors the outputs of the serial register 19. According to the mode of operation, the counter 21 counts continuously up to 15 (for regular 15 bit transmission), or up to 18 (for TDM 18 bit transmission). The signal Load is an output of the sequencer 22 and is used to lock the data in the parallel register 23. Digital data are converted back to analog in converter 24, and are displayed on the control monitors of console 7A (see FIG. 1). The parallel register latch 23 in this embodiment is a 74F604 IC with two multiplexed sets of inputs. The D/A converter 24 is a commercially available AD565AJD IC.

The mode of operation and the channel number to be selected (in the case of TDM mode of operation) are selected from the operator's console 6. The appropriate command is serial transmitted through an RS232 link 25*a* (see FIG. 2) serial port to the on-board micro-controller 25, which in this embodiment is an Intel Corp, 87C51AF. The I/O ports of this micro-controller provide that information to the inputs of the decoder/-sequencer module 22 and to the pattern recognition logic circuit 20.

The 15 bit frame structure or configuration for a one channel mode of transmission 12 is illustrated in FIG. 6*a*. As discussed above, FIG. 6*b* illustrates the frame configuration and bit assignment for an 18 bit frame structure, as used in TDM mode of operation. A spare bit can be used later for signaling.

The encoding/framing method used in practicing the invention provides a minimum amount of extra bits for framing (low overhead) and also prevents some particular data transmitted patterns from locking the decoder/-sequencer circuit. In order to do that, the stop bit is toggled for each consecutive character or frame transmitted. To illustrate this, assume that all the framing bits: start, type and stop are all assigned "1". Then, for a particular signal, DC level, that is digital converted in a string of "1", so it becomes impossible to separate the particular frames in the transmission bit stream and to detect-decode and synchronize the reception. As the signal is referred for "pattern recognition" it is recognized in the pattern recognition circuit 20 of the frame pattern for four consecutive frames. The recognition circuit 20 is "watching" the incoming serial synchronous string of bits in the serial register 19. This register is a "pipe" holding four transmitted frames at a given time; a total of 48 bits. In Appendix B, the listing file describes the logic equations for the 15 bit pattern recognition. Lines 21 to 32 describe the input pin assignments from the serial register 19. The comments in the listing mention the function of each used bit (i.e. start, stop, or type).

As mentioned above, the stop bit is toggled, so two cases of pattern recognition are considered, depending on what is the value of the first stop bit in the "pipe": lines 42 and 48 provide the logic equations. Line 55 combines the two possibilities. The string of serial received bits are shifted synchronously into the register. Once the pattern is recognized and the output is validated for that period of the clock, the next pattern is recognized only after 15 consecutive clock pulses (assuming that a valid string of data frames comes at the input of serial register 19).

The above example presents the pattern synchronization for a non-TDM type of transmission. For the TDM type, the length of the pattern is 18 bits; the bits monitored from the serial register 19 are different and, also, the channel number is used in the decoding scheme.

FIG. 8 illustrates in more detail the circuitry for the state machine of the receiver decoder/sequencer channel 7 (which state machine is represented by the circuit diagram blocks 20, 21 and 22 in FIG. 5). And, in Appendix C, there is shown the documentation file used for programming the state machine component 22 used in the FIG. 5 embodiment, as part of the system circuit shown in FIG. 1.

The "boxes" shown in FIG. 8 represent separate stata, binary encoded, of the state machine or of its sequencer. The lines interconnecting these boxes represent the conditions (i.e. the lines marked with a dot next to the notations "time-nopattern") of the inputs of the sequencer on which a transition is made from one state to the next. On different conditions the transition from one state can lead to different new states. The circled signals shown in FIG. 8 represent the output signals generated at the transition time.

The lines 22 to 43, in the listing of Appendix C, represent the input and output pin assignment for the sequencer, according also to the attached chip diagram as part of Appendix C. The output "Sync" is active low when the state machine is in synchronous mode. The outputs Q0 to Q4 encode the stata as it is shown in lines 50 to 68 of Appendix C.

Line 71 represents the equation of the condition (nosync_pattern_rec) in which the pattern is recognized, the machine being in nonsynchronous mode (Sync output is high).

Line 76 represents the equation of the condition (no_time_cnt15_cnt18) in which no output signal exists from the counter-timer 21 (of FIG. 5) in either one of the operation modes; TDM (18 serial bits), or non TDM (15 serial bits).

Line 89 is the condition when the signal from the counter-timer is valid but the pattern is not recognized (time_nopattern).

Line 100 describes the condition when the signal from the timer is valid at the same moment when the pattern is recognized (time_pattern)

Line 107 is the equation for the Load output from sequencer 22 used to latch the valid data in D/A converter 24. Similarly, one can follow in Appendix C the equations for the Reset of the timer 21, the Sync bit indicating the mode of operation, and the operation for the bits Q0 to Q4 of the state machine.

With the meaning of the equations of the conditions shown in Appendix C explained, the operation of the sequencer-decoder circuit will now be described, following the state diagram from FIG. 8. This state diagram is the support flowchart of the program of Appendix C and the notations (for stata, for the conditions of the transitions and for the output signals) are kept the same for compatibility reasons.

Starting from state S0 (A) in non-synchronized mode (Sync signal is high and no Load signal is provided at the output of the sequencer 22); when the pattern is recognized, a transition is made on that condition in state S8 (G) and an output signal is resetting the counter 21. The counter starts to count from zero. The sequencer "goes" in S5 (H) where it "waits" until the output of the counter is valid (the loop shown on condition no_time_cnt15_cnt18). As was stated above, the same decoder circuit is controlled to be used in both modes of operation and, as a consequence, the logic equations cover both cases; count for 15 bits or for 18 bits.

When the time is valid and the pattern is not recognized, from The S5 (H), the sequencer goes back in S0 (A). The main loop S0, S8, S5 is repeated until The pattern is recognized synchronously with the output of the counter-timer. Then, on that condition, the next state is S7 (J) and the output Sync is valid (low).

Starting from S0, being in synchronous mode, the next state is S1 (B) when it waits for a valid output from the counter. On the condition that the counter is synchronous with the pattern recognized (time_pattern condition), the next state is back to S0 and a Load output signal is generated to latch the new data in register 23.

The 12 bits of deframed data from the serial register 19 are loaded in register 23, and the D/A converter 24 provides an up-dated output.

In normal synchronous operation, the state machine is looping between S0 and S1; at each cycle (one per frame) it generates the Load signal to refresh the data in the latched register 23 and consequently at the output of the A/D converter 24.

As it is shown, the pattern is recognized every 15 or 18 bits according to the mode of operation. Because of the low number of bits used for framing, some dummy pattern recognized signals can be generated by some particular sequence of the incoming data bits in register 19. To avoid that, the pattern recognized condition is reinforced with the condition that, once the synchronization is established, the pattern recognition has to be coincident (synchronous) with the bit counter-timer. The bit counter is in the 15 bit mode or 18 bit counting mode, depending on the type of pattern (transmission).

When an error appears in the transmission and the pattern is not recognized, the sequencer is passing through stata S16 (C), S2 (D), S24 (E), S12 (F). In S12 the output Sync signal goes high, that means that the sequencer is out of synchronization with the incoming data frames. The sequencer goes back in the loop of stata S0, S8, S5 waiting to get synchronized.

An important feature of the invention is that the state machine is made to tolerate one error frame before it goes out of synchronization. It behaves as having an inertial delay (a so-called "flywheel"), which gives another chance to the receiver to continue to decode the incoming data, before the state machine goes out of synchronization. Assuming that the state machine is in synchronous mode, looping between the stata S0 and S1, and assume that a bit error at the input of the serial shift register 19 prevents the next pattern recognition signal from appearing at the expected moment, synchronous with the bit counter; then, from S1, the next state is S16 on the condition "time_nopattern". In S16 it is waiting another frame interval (15 or 18 bits). The errored bit will be shifted along the shift register, producing the failure of pattern to be recognized for three times, before it is out of the register. If no other new error bit has entered in the "pipe", then in S24 the time will coincide with the pattern recognized and the normal loop S0, S1 is resumed without exiting the synchronous mode. The errored frames are discarded and lost; no Load signal was generated. If the errors continue more than once, from S24 it goes to S12; the Sync bit is set high and the right branch of the flowchart is resumed (S0, S5, S7) until the synchronization is established again.

It is not an easy task to encode the sequencer 22 stata (assigning the binary number to each individual state: as for S8 (G) the code is 00010). The number of conditions that it had to satisfy in order to cover both modes of operation (TDM and non TDM), and the fault tolerant feature, produced a high number of product terms in the logical equations. The circuit component part used, the Am16r8-7 IC, has 7.5 ns maximum propagation delays, and it satisfies the required timing constraints of the preferred embodiment. A disadvantage is that it has the number of product terms limited to 8. In assigning the binary codes to the different stata of the sequencer, a Gray code is a recommended alternative: two consecutive stata differ by only one bit value, in order to increase the reliability of the state machine. With the PLD described herein this was not possible, because the maximum number of product terms is limited to 8. Consequently, with such an embodiment of the invention one does not have the flexibility of different choices for encoding.

To go back into the synchronous mode from a nonsynchronous mode and properly detect the frame, it takes as long as 6 valid consecutive frames before the Load occurs on the sixth correct frame. The receiver sequencer/decoder circuit 7 as shown in FIG. 1, and 7' as shown in detail in FIG. 5, can be controlled to work in TDM or non-TDM mode of operation according to the type of command sent from the operator to the local micro-controller 25. In the TDM mode the desired channel to be decoded is selected also from the operator console 6. As was described for the case of the digital multiplexer, the operator communicates to the micro-controller through an RS232 link line 25*a*. The micro-controller recognizes its own address and executes the command sent from the operator.

For the preferred embodiment, the packaging used for the Data Transmission and Multiplexing circuitry shown in FIG. 1, is presented in FIG. 9. The implementation of the preferred embodiment of the design of the invention is based on multilayer Eurocard-type boards in accordance with the mechanical and electrical recommendations of the VME (Motorola standard) backplane specifications. Special care needs to be taken in order to reduce noise and crosstalk problems. Four channels of the high speed A/D transmitter encoder channels 1, in FIG. 1, are packed on a card 35, which is VME 6U size. The four channel time multiplexed transmitters 2, in FIG. 1, are also designed as one card module 35*a* of the same size (VME 6U).

The optical/electrical transmitter module 26 (also see 3, in FIG. 1) has two channels per card of half size (3U). The same modularity is used for the optical/electrical receiver card 27 (3*a*, in FIG. 1). The electrical/optical interface design for cards 26 and 27 is a high performance link designed for data rates from 1 to 50 Mb/s (mega bits per second) at a distance up to 3 Km (Kilometers) using a typical optical wavelength of 875 nm (nanometers). The design is based on the AT&T Company's ODL-50 chip set. The link is designed to operate with 62.5/125 μm (micrometer) optical fiber, but it is compatible with 50/125 μm as well. The optical connectors mate with Series Multimode Fiber Connectors (ST) type. The typical link power margin of the interface is about 18 dB (decibel). The interface is flexible, versatile and easy to use in a wide spectrum of applications for data communications in the bandwidth of the 50 Mhz, including DC levels or burst mode. The transmitter and the receiver components are pin-to-pin compatible with long wavelength data links (typical optical wavelength being 1340 nm). That gives flexibility to the interface so it can be easily converted to a high performance link for data rates from 1 to 50 Mb/s, at a distance of up to 11 Km, using the same type of 62.5/125 μm optical fiber. The clock recovery module AT&T T7032 used in the receiver is very useful for data reconditioning and dejittering at the receiver end. Each of the two cards (the transmitter and the receiver) has the I/O electrical channels ECL or TTL compatible, jumper selectable.

The whole system for digital data Multiplexing and decoding is located in the Main Control Room (MCR), in the preferred embodiment, and is packaged in one commercially available VME type rack 28. The receiver/driver card 29 does the ECL/TTL conversion and has 32 channels per card.

The digital multiplexer card 30 can have from 32 to 128 inputs (with 32 increment) and 32 outputs. Those 32 outputs represent the four display consoles 34 (also see 7, in FIG. 1), each one with eight signal channels. A maximum of two such multiplexer cards can be used, providing a maximum 256 input digital multiplexer.

The receiver sequencer/decoder and D/A converter cards 31 have four channels per card. In order to accommodate all the desired 32 output channels, eight such cards are required. The digital multiplexer 5 (in FIG. 1) is remote controlled from the keyboard of the Operator Console 32 (see 6, in FIG. 1). In the Console 32 a similar micro-controller Intel 87C51AF is used as a master, in order to communicate with the micro-controllers resident on the digital multiplexer cards 30 and the sequencer/decoder card 31, using the RS232 line (also see 9*a*, in FIG. 2). As it was described above, the serial data transmission and detection is synchronous. All the component circuits are designed to work synchronously. All the encoder/transmitter/modules 35 and 35*a*, TDM or non-TDM, use the same base clock frequency. The decoder channels 31 use the same type of Manchester decoder IC. The design of the whole circuit has a flexibility such that by just changing the channel oscillator frequency in the encoders/transmitters modules (35 and 35*a*) and changing, accordingly, the Manchester decoder IC in the receiver sequencer/decoder modules cards 31, one can have different data transmission rates in the range of 2 Mega bits per second (Mb/s) up to the desired specified speed of 15 Mb/s for the preferred embodiment. The performance (the sampling rate) will be lowered accordingly.

Mode of Operation

As presented above, raw data is captured by high speed A/D converters 35 (in FIG. 9), from source devices which can be any devices that generate an analog signal in the bandwidth of 0 to 100 Khz. Lower speed channels in the bandwidth of 0 to 20 Khz are four channel, Time Division Multiplexed in TDM type converters 35*a*. The Digital data are encoded, framed, and transmitted over twisted pair wires and through electrical/optical interfaces 26, optical fibers, and optical/electric interfaces 27 to the Rack 28 in the Main Control Room. The output of the optical/electrical interface 27 sends the serial streams of data on twisted pair wires, using ECL drivers, to the receiver/driver cards 29 where the signals are converted back to TTL levels. All the input channels, (maximum of 256) are connected through the interface cards 29 to the inputs of the digital multiplexer cards 30. The 32 outputs of the digital multiplexer cards 30 are connected to the receiver/decoder cards 31 and converted D/A, in order to be displayed at the consoles 34.

Each input of the maximum possible 256 inputs of the digital multiplexer 30 has assigned to it a "physical link" to the output of a specific device generating an analog signal. In the case of the digital multiplexer inputs assigned to the TDM type of transmission, there are four possible devices (four possible channels) assigned to that input; only one of them can be selected and displayed at a time. A human computer operator at the console 32 is provided with a "map" (device cross-reference table) in which is kept the information: "What device is assigned to which input number of the digital multiplexer". In other words, the inputs of the digital multiplexer 30 are each assigned fixed known device locations (or device names). Data streams of synchronous encoded frames are continuously sent to everyone of these "assigned" inputs of the receiver/driver cards 29 and then to the digital multiplexer cards 30. Only 32 of these data streams are routed (connected) at a time, by the digital multiplexer (according to the configuration being described here) to the receiver sequencer/decoder card channels 31, and then decoded and D/A converted in order to be displayed on the display console monitor 34.

When the master micro-controller from terminal 32 wants to transmit a block of data to one of several slaves, located on cards (30 or 31), it first sends out an address byte which identifies the target slave. An address byte will interrupt all slaves so that each can examine the received byte and see if it is being addressed. The addressed slave will prepare to receive the data bytes (or commands) that will be coming. The slaves that were not being addressed ignore the incoming data bytes. As was discussed above, there is one slave micro-controller on each of the two digital multiplexer cards 30 and one slave micro-controller on each of the eight receiver/decoder cards 31. As was presented, the micro-controllers on the card modules 30 are used to configure the digital multiplexer; the micro-controllers on the card modules 31 are used to select the mode of operation, TDM or non-TDM, and to select the channel to be displayed (in the case of the TDM mode of operation).

Any of the input signals of the digital multiplexer can be connected to any of the 32 outputs by an operator at the console 32. Thus, the digital Multiplexer is remote controlled. From the keyboard of the Operator Console 32 the operator can determine a rate in the range of the BER $=3.2\times10\sim11$.

APPENDIX A

```
PL/M-51 COMPILER
DOS 3.30 (038-n) PL/M-51 V1.2
COMPILER INVOKED BY: C:/INTEL/PLM51/PLM51.EXE A:MUX4.P51
        $TITLE ('Mux - local controller - Jan. 19, 1989')
        $debug
        /* CONNECT INPi TP OUTPi FOR DIG MUX 1 */
        /* DESCONNECT ALL THE OTHERS */
        /* READ AND CHECK THE MUX DATA REGISTER */
 1  1       muxco: DO; /* start of module */
        $nolist
 5  1   DECLARE Led1_P1_1 BIT AT(91H) REG: /* bit that lights
        led 1*/
 6  1   DECLARE Led2_P1_2 BIT AT(92H) REG: /* bit that lights
        led 2*/
 7  1   DECLARE ENN_P1_3 BIT AT(93h) REG: /* enable stroo
        active H*/
 8  1   DECLARE WRN_P1_4 BIT AT(94H) REG: /* write active L
        */
 9  1   DECLARE CSB_P1_5 BIT AT(95H) REG: /* encoded csl to
        cs4 */
10  1   DECLARE CSA_P1_6 BIT AT(96H) REG:
11  1   DECLARE RSTN_P1_7 BIT AT(97H) REG: /* reset mux active
        L */
12  1   DECLARE ADDMUX_P0 BYTE AT(80H) REG: /* P0.0 to P0.4 sel
        1/32 mux
13  1   DECLARE INDATA_P2 BYTE AT (0A0H) REG: /* P2.0 to P2.4
        ino # */
14  1   DECLARE OUTSTAT_P2 BIT AT(0A5H) REG: /*P2.5 out
        status */
15  1   DECLARE (I,J,K,L,) BYTE MAIN;
16  1   DECLARE ERR BYTE PUBLIC;
17  1   DECLARE FOREVER LITERALLY 'WHILE 1';
18  1   DECLARE INOUT_PTR BYTE MAIN; /* cross_ref memory */
19  1   DECLARE (INOUT BASED INOUT_PTR) (128) BYTE MAIN;
20  2   Connect: PROCEDURE(L) PUBLIC;
21  2   DECLARE (K,L) BYTE;
22  2   DECLARE (INOUT BASED INOUT_PTR) (128) BYTE MAIN;
23  3   DO K = O TO L;
24  3       ADDMUX_PO = K;
25  3       INDATA_P2 = 1;
26  3       OUTSTAT_P2 = 1;
27  3       WRN_P1_4 = 0; /* toggle write */
28  3       ENN_P1_3 = 0; /* toggle enable */
29  3       ENN_P1_3 = 1;
30  3       WRN_P1_4 = 1;
31  3   END; /* end do */
32  1   END Connect;
            /* Z-state (desable) the 32 outputs */
33  2   Disconnect: PROCEDURE(L) PUBLIC;
34  2   DECLARE (K,L) BYTE;
35  3   DO K = O TO L;
36  3       ADDMUX_P0 = K;
37  3       OUTSTAT_P2 = 0;
38  3       WRN_P1_4 = 0; /* toggle write */
39  3       ENN_P1_3 = 0; /* toggle write */
40  3       ENN_P1_3 = 1;
41  3       WRN_P1_4 = 1;
42  3   END; /* end do */
43  1   END Desconnect;
44  2   TestMux: PROCEDURE(L) PUBLIC;
45  2   DECLARE (K,L,MUXDAT,ERR) BYTE;
46  2   DECLARE MASK1 byte constant (127); /* 00111111 */
47  2   DECLARE (INOUT BASED INOUT_PTR) (32) BYTE MAIN;
```

-continued

APPENDIX A

```
48  3   DO K = O TO L:
49  3       ADDMUX_P0 = K;
50  3       ENN_P1_3 = 0; /* toggle enable */
51  3         MUXDAT = INDATA_P2; /* read mux out data */
52  3       ENN_P1_3 = 1;
53  3         IF (MUXDAT AND MASK1) () INOUT (K) THEN ERR =
            1:
55  3         ELSE ERR = 0;
56  3   END; /* end do */
57  1   END TestMux;
        /* init RAM table inout */
58  1   INOUT (0) = 0;
59  2   DO J = 1 TO 31;
60  2       INOUT(J) = INOUT (J-1) + 1: /* inp i is connected
            to outp i */
61  2   END;
            /* initialization for mux 1 of 4 */
            /*connect mux 1 of 4 to outp; desconnect the
            others */
62  1   CSB_P1_5 = 0: /* decoded as chip sel 2*/
63  1   CSA_P1_6 = 1:
64  1   CALL DESCONNECT (31);
65  1   CSB_P1_5 = 1: /* decoded as chip sel 3 */
66  1   CSA_P1_6 = 0:
67  1   CALL DESCONNECT(31);
68  1   CSB_P1_5 = 0: /* decoded aschip sel 4 */
69  1   CSA_P1_6 = 0;
70  1   CALL DESCONNECT(31):
71  1   CSB_P1_5 = 1; /* decoded as chip sel 1 */
72  1   CSA_P1_6 = 1;
73  1   CALL CONNECT (31);
74  1   CALL TESTMUX(31);
75  1   IF ERR =1 THEN
76  2         DO;
77  2       Led1_P1_1 = 0;
78  2       Led2_P1_2 = 1;
79  3       DO FOREVER;
80  4       DO I = 0 to 25;
81  4       CALL TIME (300); /*this loop should take 500ms*/
82  4       END;
83  3       Led1_P1_1 = NOT Led1_P1_1;
84  3       Led2_P1_2 =. NOT Led2_P1_2;
85  3       END; /*DO forever*/
86  2         END;
87  1   ELSE
            DO;
88  2       Led1_P1_1 = 0; /* LED OFF */
89  2       Led2_P1_2 = 0;
90  3         DO FOREVER;
91  4       DO I = 0 to 25;
92  4       CALL TIME (300); /*this loop should take 500ms*/
93  4       END;
94  3       Led1_P1_1 = NOT Led1_P1_1;
95  3       Led2_P1_2 = NOT Led2_P1_2:
96  3       END; /*DO forever*/
97  2         END;
98  1   END muxco;
```

| MODULE INFORMATION: | (STATIC+OVERLAYABLE) | |
|---|---|---|
| CODE SIZE | = 011BH | 283D |
| CONSTANT SIZE | = 0001H | 1D |
| DIRECT VARIABLE SIZE | = 06H+04H | 6D+ 4D |
| INDIRECT VARIABLE SIZE | = 00H+00H | 0D+ 0D |
| BIT SIZE | = 00H+00H | 0D+ 0D |
| BIT-ADDRESSABLE SIZE | = 00H+00H | 0D+ 0D |
| AUXILIARY VARIABLE SIZE | = 0000H | 0D |
| MAXIMUM STACK SIZE | = 0006H | 6D |
| REGISTER-BANK(S) USED: | 0 | |
| 216 LINES READ | | |
| 0 PROGRAM ERROR(S) | | |
| END OF PL/M-51 COMPILATION | | |

APPENDIX B

| | |
|---|---|
| 1:Name | DCODE-15bits: |
| 2:Partno | RX4 U1: |
| 3:Date | 2/20/89; |
| 4:Revision | 08: |

-continued

APPENDIX B

| | |
|---|---|
| 5:Designer | R.M.; |
| 6:Company | B.N.L.; |
| 7:Assembly | SER. REC. DECODER for the 15 bits fast transm 16R4-7; |

-continued

APPENDIX B

```
8:Location     U1;
9:
10:/*************************************************************/
11:/*This device is used for pattern (frame) recognition of the
   high*/
12:/*speed serial transmission.                                  */
13:/*                                                            */
14:/*************************************************************/
15:/* Allowable Target Device Types: 16R4-7                      */
16:/*************************************************************/
17:
18:/** Inputs **/
19:                                                             */
20:Pin 1    = CLKMANCH   ; /* Manchester clock                  */
21:Pin 13   = B0         ; /* BIT 0    stop    */
22:Pin 12   = B1         ; /* BIT 1    start   */
23:Pin 9    = B2         ; /* BIT 2    type    */
24:Pin 8    = B15        ; /* BIT 15   stop    */
25:Pin 7    = B16        ; /* BIT 16   start   */
26:Pin 6    = B17        ; /* BIT 17   type    */
27:Pin 5    = B30        ; /* BIT 30   stop    */
28:Pin 4    = B31        ; /* BIT 31   start   */
29:Pin 3    = B32        ; /* BIT 32   type    */
30:Pin 2    = B45        ; /* BIT 45   stop    */
31:Pin 19   = B46        ; /* BIT 46   start   */
32:Pin 18   = B47        ; /* BIT 47   type    */
33:Pin 11   = !oe;
34:
35:/** Outputs **/
36:
37:Pin 16   = PATTERN12   ; /* pattern recognized                */
38:
39:/** Declarations and Intermediate Variable Definitions **/
40:
41:
42:PATT12A   = B0 & B1 & B2 & /* the transm stop bit is
   toggled */
43:            !B15 & B16 & B17 & /*PATT12A -B covers both
   situations */
44:            B30 & B31 & B32 &
45:            !B45 & B46 & B47;
46:
47:
48:PATT12B   = !B0 & B1 & B2 &
49:              B15 & B16 & B17 &
50:              !B30 & B31 & B32 &
52:              B45 & B46 & B4&;
52:
53:/** Logic Equations **/
54:
55:PATTERN12.D = !(PATT12A # PATT12B);
56:
57:/* start = 1, type = 1, 12 data, stop = toggled ; 15 bits: 4
   patterns used */
58:/* 48 bits string length, 15 bits pattern recognized, stop
   bit toggled */
59:
60:
Jedec Fuse Checksum        (064A)
Jedec Transmit Checksum    (6C16)
```

Chip Diagram

DCODE-12b

```
CLKMANCH x--- 1        20 ---x Vcc
         B45 x--- 2    19 ---x B46
         B32 x--- 3    18 ---x B47
         B31 x--- 4    17 ---x
         B30 x--- 5    16 ---x PATTERN12
         B17 x--- 6    15 ---x
         B16 x--- 7    14 ---x
         B15 x--- 8    13 ---x B0
         B 2 x--- 9    12 ---x B1
         GND x---10    11 ---x !oe
```

APPENDIX C

LISTING FOR LOGIC DESCRIPTION FILE: seq16r83.old.old

```
1:Name       SEQ16R83;
2:Partno     RX4 U;
3:Date       02/24/89;
4:Revision   4;
5:Designer   R.M.;
6:Company    B.N.L.;
7:Assembly   SER.REC.DECODER State Machine;
8:Location   U;
9:Device     p16r6-7.5;
10:
11:/*************************************************************/
12:/* complete VERSION INCLUDE TDM decoding                      */
13:/* TOLERATES 1 BIT ERROR IN THE BIT TRANSMISSION STRING       */
14:/* Sinchrouous receiver state machine with fly wheel
   algorithm */
15:/* CUPL state machine syntax is used.                         */
16:/*************************************************************/
17:/*Allowable Target Device Types: 16r8-17.5
18:/*************************************************************/
19:
20:/** Inputs **/
21:
22:pin 1   = CLKN ;          /* CLK- reversed phase clock        */
23:pin 2   = !TIME15;        /* Counted 15 pulses; from the
   timer-counter
24:pin 3   = !TIME18D;       /* Counted 18 pulses; from the
   timer-counter */
25:pin 4   = CNTTYPE;        /* Counter mode 15 for non_l tom or 18
   input for tdm */
26:                          /* H for non_TDM L for TDM mode */
27:pin 6   = !PATTERN18;     /* Any 18 bit pattern recognized */
28:pin 5   = !PATT18CHAN;    /* Patter and chan recognized. TDM
   12 d bits ) */
29:pin 7   = !PATTERN15;     /* Pattern recognized, fast mode (12
   dat bits) */
30:pin 8   = !SEQPRESET;     /* when H it is reseting
   the seq
31:
```

-continued

APPENDIX C

```
32:/** Outputs **/
33:pin 19 = !Q4;          /* State Machine outputs        */
34:pin 15 = !Q3;          /* State Machine outputs        */
35:pin 14 = !Q2;          /* State Machine outputs        */
36:pin 13 = !Q1;          /* State Machine outputs        */
37:pin 12 = !Q0;          /* State Machine outputs        */
38:
39:pin 16 = !RESTIME;     /* Reset Counter-Timer, synchronous
   output */
40:
41:pin 17 = !SYNC;        /* Sinchronized on the bits pattern, synch
   output */
42:                       /* active L */
43:pin 18 = !LOAD;        /* Latch data in the paralel outp req,
   sinch outp */
44:
45:
46:/** Declarations and intermediate Variable Definitions **/
47:
48:
49:
50: S0 = !Q0 & !Q1 & !Q2 & !Q3 & !Q4;
51: S1 = Q0 & !Q1 & !Q2 & !Q3 & !Q4;
52: S2 = !Q0 & Q1 & !Q2 & !Q3 & !Q4;
53: S3 = Q0 & Q1 & !Q2 & !Q3 & !Q4;
54: S4 = !Q0 & !Q1 & Q2 & !Q3 & !Q4;
55: S5 = !Q0 & !Q1 & Q2 & !Q3 & !Q4;
56: S6 = !Q0 & !Q1 & Q2 & !Q3 & !Q4;
57: S7 = Q0 & Q1 & Q2 & !Q3 & !Q4;
58: S8 = !Q0 & !Q1 & !Q2 & Q3 & !Q4;
59: S9 = Q0 & !Q1 & !Q2 & Q3 & !Q4;
60: S10 = !Q0 & Q1 & !Q2 & Q3 & !Q4;
61: S11 = Q0 & Q1 & !Q2 & Q3 & !Q4;
62: S12 = !Q0 & !Q1 & Q2 & Q3 & !Q4;
63: S13 = Q0 & !Q1 & Q2 & Q3 & !Q4;
64: S14 = !Q0 & Q1 & Q2 & Q3 & !Q4;
65: S15 = Q0 & Q1 & Q2 & Q3 & !Q04;
66: S16 = !Q0 & !Q1 & !Q2 & !Q3 & Q4;
67: S17 = Q0 & !Q1 & !Q2 & !Q3 & Q4;
68: S24 = !Q0 & !Q1 & !Q2 & Q3 & Q4;
69:
70:
71:nosvnc_pattern_rec          = !SYNC & PATTERN15 & CNTTYPE
72:                            # !SYNC & PATTERN18 & !CNTTYPE ;
73:        /* pattern is recogn but the sequencer is not yet in
   sync mode */
74:        /* SYNC is H */
75:
76:no_time_cnt15_cnt18         = !TIME15 & CNTTYPE
77:                            # !TIME18D & !CNTTYPE;
78: /* time not yet on; for mode15 or for mode 18 TIME is H */
79:/* no_time_cnt18 = !TIME18D & !CNTTYPE ; */
80:        /* time not yet on; for mode18 TIME is H*/
81:
82:
83:/* time_nopattern15           = TIME15 & !PATTERN15 & ONTTYPE; */
84:        /* time15 is on but no pattern15 is recognized */
85:        /* TIME is L , PATT is H are declared neg logic */
86:/*time_nopattern18            = TIME18 & !PATTERN18 & !CNTTYPE; */
87:        /* time 18 is on but no pattern18 is recognized */
88:        /* TIME is L , PATT is H */
89:time_nopattern               = TIME15 & !PATTERN15 & CNTTYPE
90:                            # TIME18D & !PATT18CHAN & !CNTTYPE;
91:        /* time is on but no pattern is recognized */
92:        /* TIME is L , PATT is H */
93:
94:time_pattern15               = TIME15 & PATTERN15 & CNTTYPE;
95:        /* time is on and pattern is recognized; for the 15 */
96:        /* TIME is L PATT is L */
97:/* time_pattern18             = TIME18 & PATTERN18 & !CNTTYPE &
   CHMATCH ; */
98:        /* time is on and pattern is recognized; for the 18 */
99:        /* TIMEis L PATT is L */
100:time_pattern                = TIME15 & PATTERN15 & CNTTYPE
101:                            # TIME18D & PATT18CHAN & !CNTTYPE ;
102:       /* time is on and pattern is recognized; for the 15 or
   for 18 mode
103:       /* TIME is L PATT is L */
104:
105:/** Logic Equations **/
106:
```

-continued

APPENDIX C

```
107:LOAD.o = ( !LOAD & time_pattern & Si
108:        # !LOAD & time_pattern15 & S2
109:        # !LOAD & time_pattern15 & S24
110:        # !LOAD & time_pattern15 & S16 ) & !SEQPRESET;
111:
112:
113:RESTIME.d = !RESTIME & S0 & !SYNC # RESTIME & !S8;
114:
115:SYNC.d = ( !SYNC & S7 # SYNC & S0
116:              # SYNC & S1 # SYNC & S16 SYNC & S24
117:              # SYNC & S2 ) & !SEQPRESET;
118:                /* when reseted sync is H -desincr-*/
119:
120:Q0.d =         ( !Q0 & S0 & SYNC                                  /* SQ - S1 */
121:               # Q0 & no_time_cnt15_cnt18 & S1                    /* S1 - S1 */
122:               # !Q0 & S8                                         /* S8 - S5 */
123:               # Q0 & no_time_cnt15_cnt18 & S5                    /* S5 - S5 */
124:               # Q0 & S5 & time_pattern ) & !SEQPRESET;           /* S5 - S7 */
125:
126:Q1.d =         ( !Q1 & S16 & time_nopattern                       /* S16 - S2 */
127:               # Q1 & no_time_cnt15_cnt18 & S2                    /* S2 - S2 */
128:               # !Q1 & S5 & time_pattern ) & !SEQPRESET;          /* S5 - S7 */
129:
130:Q2.d =         ( !Q2 & S24 & time_nopattern                       /* S24 - S12 */
131:               # !Q2 & S8 # Q2 & no_time_cnt15_cnt18 & S5         /* S8 - S5,
   S5 - S5 */
132:               # Q2 & S5 & time_pattern ) & !SEQPRESET;           /* S5 - S7 */
133:
134:Q3.d =         ( !Q3 & S0 & nosync_pattern_rec                    /* S0 - S8 */
135:               # !Q3 & S2 & time_no pattern                       /* S2 - S24 */
136:               # Q3 & S24 & no_time_cnt15_cnt18                   /* S24 - S24 */
137:               # Q3 & S24 & time_nopattern ) & !SEQPRESET;        /* S24 - S12 */
138:
139:Q4.d = (!Q4 & S1 & time_nopattern                                 /* S1 - S16 */
140:               # !Q4 & S2 & time_nopattern                        /* S2 - S24 */
141:               # Q4 & S24 & no_time_cnt15_cnt18                   /* S24- S24 */
142:               # Q47 & S16 & no_time_cnt15_cnt18 ) & !SEQPRESET;  /* S16 - S16 */
143:
144:
Jedec Fuse checksum        (957A)
Jedec Transmit Checksum    (B87E)
```

Chip Diagram

SEQ16R83

```
                CLKN x--- 1        20 ---x vCC
             !TIME15 X--- 2        19 ---X !Q4
            !TIME18D x--- 3        18 ---x !LOAD
             CNTTYPE x--- 4        17 ---x !SYNC
         !PATT18CHAN x--- 5        16 ---x !RESTIME
           !PATTERN18 x--- 6       15 ---x !Q3
           !PATTERN15 x--- 7       14 ---x !Q2
           !SEQPRESET x--- 8       13 ---x !Q1
                  x--- 9           12 ---x !Q0
                 GND x--- 10       11 ---x
```

From the description of the preferred embodiment of the invention presented herein, it will be apparent to those skilled in the art that various modifications and improvements can be made in the invention without departing from the scope of its teaching. Accordingly, the true limits of the invention are intended to be defined by the following claims.

I claim:

1. A circuit for digital data capture at high speed, serial data transmission and multiplexing over long distance and for selecting and continously displaying real time analog signals, comprising; a plurality of data sampling A/D converting, encoding, framing and transmitting modules (1), a plurality of data sampling A/D converting, TDM encoding, framing and transmitting modules (2) for generating character frames for serial synchronous data transmission, a plurality of electric/optic Serial interfaces (3) each of which is operatively connected, respectively, to one of said modules (1 or 2), a plurality of optic/electric interfaces each of which is operatively connected by a fiber-optic data transmission means to one of said electric/optic interfaces, for electrical and optical line communication between said interfaces, a high speed digital multiplexer cross point switch module (5), a plurality of receiver sequencer/decoder and D/A converter circuits (7) each of which include a state machine (11) and is computer programmable, said multiplexing module (5) being made non-blocking and remotely configurable by predetermined computer program signal input from an operator console (6), whereby any input signal received by the multiplexing module can be selectively received and displayed at a display console (7A), and whereby the same input signal can be selected and displayed at the same time at different display consoles (7A/1-4) of said console; each of said sequencer/decoder and D/A circuits (7) being effective to use character frames of the captured data that is transmitted to it in order to detect the data characters and to synchronize such detection, and each of said receiver sequencer/decoder circuits also being made fault tolerant by a "flywheel" algorithm (Appendix C) that is programmed to tolerate one transmission error before the state machine of the sequencer/decoder circuit (4) is out of synchronization for decoding of the said transmitted frames.

2. An invention as defined in claim 1 wherein said high speed digital multiplexer module (5) is controlled by an operator using the operator console (6) to selectively route certain of the captured data input signals to given desired outputs of the receiver sequencer/decoder circuits (7).

3. An invention as defined in claim 1 wherein each of said A/D converting, encoding and framing modules (1) is operable to sample captured data at a rate of 1 Mhz and to transmit analog signals in the range 0 to 100 Khz in which each transmitted frame is made to consist of 15 bits, and wherein each said A/D converting modules (2) is provided with four channel time division multiplexing (TDM) mode of transmission and is operable to sample at a rate of 200 Khz and to transmit analog signals in the range 0 to 20 Khz in which each transmitted frame is made to consist of 18 bits.

4. An invention as defined in claim 3 wherein the first frame bit is made the "start" bit, the last bit is made the "stop" bit, and a predetermined one of the intermediate bits is made a "type" bit, in each frame of both the TDM and non-TDM mode of transmission.

5. An invention as defined in claim 4 wherein the second bit in each of said frames is made the "type" bit.

6. An invention as defined in claim 4 wherein each of said modules (1 and 2) are operable to prevent locking of said receiver sequencer/decoder (7) by toggling the "stop" bit on each frame transmitted to it, whereby the receiving of each frame is synchronized for detection by this receiver sequencer/decoder (7).

7. An invention as defined in claim 3 wherein said circuit (1) is operable to transmit signals at 1 Mhz sampling rate with 12 bits accuracy and with 3 bits overhead for framing in non-TDM mode of transmission.

* * * * *